United States Patent [19]
Narasimhalu et al.

[11] Patent Number: 5,412,718
[45] Date of Patent: May 2, 1995

[54] METHOD FOR UTILIZING MEDIUM NONUNIFORMITIES TO MINIMIZE UNAUTHORIZED DUPLICATION OF DIGITAL INFORMATION

[75] Inventors: Arcot D. Narasimhalu; Weiguo Wang; Mohan S. Kankanhalli; all of Singapore, Singapore

[73] Assignee: Institute of Systems Science, Kent Ridge, Singapore

[21] Appl. No.: 120,969

[22] Filed: Sep. 13, 1993

[51] Int. Cl.$^6$ ............................................... H04L 9/00
[52] U.S. Cl. ........................................... 380/4; 380/66
[58] Field of Search .................... 380/4, 44–47

[56] References Cited

U.S. PATENT DOCUMENTS

| | | | |
|---|---|---|---|
| 4,462,078 | 7/1984 | Ross | 380/4 |
| 4,584,641 | 4/1986 | Guglielmino | 380/4 |
| 4,785,361 | 11/1988 | Brotby | 380/4 |
| 4,866,769 | 9/1989 | Karp | 380/4 |
| 4,903,296 | 2/1990 | Chandra et al. | 380/4 |
| 5,027,396 | 6/1991 | Platterer et al. | 380/4 |
| 5,212,728 | 5/1993 | Glover et al. | 380/4 |
| 5,267,311 | 11/1993 | Bakhoum | 380/4 |

Primary Examiner—Salvatore Cangialosi

[57] ABSTRACT

The present invention is a method for preventing unauthorized copying and use of information which is stored on a storage medium and for restricting the use of such information to designated devices. Copy protection is achieved by generating a signature from a given storage medium. The signature is derived from an arbitrarily selected list of nonuniformities, uniformities and their attributes. The selected list may contain nonuniformities at any granularity level. As such, this signature is unique to a given storage medium in the same way finger prints are unique to a human being. This signature is used to derive a key for encrypting the information on the storage medium. Any copying of the distribution information from one storage medium to another results in the mutation of the signature required to decrypt the information. Therefore, the present invention obviates the need for introducing artificial indica or requiring a special hardware subsystem for achieving a copy protection scheme.

Restricting the usage of information on a distribution medium to a designated device is achieved by verifying the device ID (DID-D) of the device with the device ID (DID-S) stored in the distribution medium before the decryption and transfer of information are undertaken. Decryption of the information is accomplished by generating a key from both the signature of the distribution medium and the DID-S.

14 Claims, 7 Drawing Sheets

METHOD FOR UTILIZING MEDIUM NONUNIFORMITIES TO MINIMIZE UNAUTHORIZED DUPLICATION OF DIGITAL INFORMATION

BACKGROUND OF THE INVENTION

1. Field of the Invention

The present invention relates to the field of data processing, and in particular, to the prevention of unauthorized duplication of digital information on one storage medium to another. Furthermore, the present invention restricts the use of information on an original medium to one or more designated devices without introducing any key which is independent of the characteristics of the media.

2. Description of the Related Art

Prior art copy protection schemes rely principally on either software based methods, hardware keys or a combination thereof. Software based methods use encryption techniques to prevent conventional copying programs from making unauthorized usable copies. Unless the appropriate decryption key is found on a storage medium, the programs on the storage medium cease to function. By storage medium, the present invention refers to all types of non-volatile storage medium. Examples of such media include floppy disks, hard disks, optical disks and other non-volatile semiconductor storage devices. Lately, new generation of copying programs are sufficiently sophisticated such that most software previously protected by copy protection schemes are copied without the authorization of the information provider.

Hardware key methods employ an explicit key on the system hardware to enable the programs in the system. One such method uses as key the hardware serial number or identification number. A second method requires the user to buy a special kind of hardware with every purchase of software. Thus whenever a new software is required, the necessary hardware has to be plugged into the system hardware. As such, the number of concurrent software that can be run on a particular system is limited by the number of such special hardware that can be simultaneously connected to the system hardware.

An example of a combination of software based method and hardware key is U.S. Pat. No. 4,903,296 which claims copy protection of software on magnetic medium with a special key having two marks made on the surface of the medium. These marks are not producible by conventional disk drives and are in the form of absence of material and in the form of domains which cannot be formed by conventional magnetic disk write heads. Additionally, an encrypted key which is critical for running the application is built into a special purpose hardware subsystem. Finally the hardware subsystem is required to decrypt the key.

Another patent is U.S. Pat. No. 4,866,769 which claims a method of copy protection of personal computer software distributed in diskettes through the use of an unique identification stored in read only memory of a personal computer. A source ID is provided with every software distributed. The personal computer ID is used with the source ID on the distribution diskette to produce an encoded check word, using any available encryption method. This check word is then used to verify that the software is being used on the designated personal computer.

To prevent unauthorized copying and use of information, prior art copy protection schemes require either introducing artificial indica as software keys or requiring special hardware subsystems. Not only are these solutions more costly to both the information providers and the users as they require additional processing steps but they are also incompatible with the trend of encouraging concurrent use of different types of information in a network environment. Furthermore, the prior art copy protection schemes are restrictive in that they prevent unauthorized copying and use of only software in magnetic medium.

SUMMARY OF THE INVENTION

The present invention is a method for preventing unauthorized copying and use of information which is stored on a storage medium and for restricting the use of such information to designated devices. Copy protection is achieved by generating a signature from a given storage medium. The signature is derived from an arbitrarily selected list of nonuniformities, uniformities and their attributes. The selected list may contain nonuniformities at any granularity level. As such, this signature is unique to a given storage medium in the same way finger prints are unique to a human being. This signature is used to derive a key for encrypting the information on the storage medium. Any copying of the distribution information from one storage medium to another results in the mutation of the signature required to decrypt the information. Therefore, the present invention obviates the need for introducing artificial indica or requiring a special hardware subsystem for achieving a copy protection scheme.

Restricting the usage of information on a distribution medium to a designated device is achieved by verifying the device ID (DID-D) of the device with the device ID (DID-S) stored in the distribution medium before the decryption and transfer of information are undertaken. Decryption of the information is accomplished by generating a key from both the signature of the distribution medium and the DID-S.

DETAILED DESCRIPTION OF THE INVENTION

Figure 1:
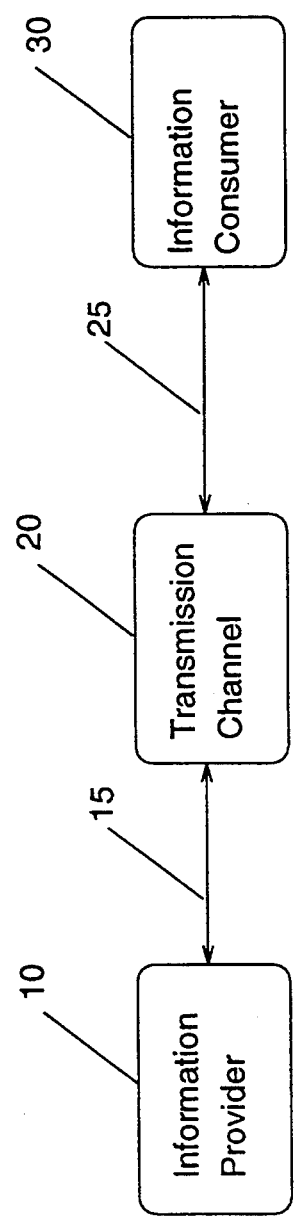
FIG. 1 is a model of information dissemination.

A method and apparatus for utilizing medium nonuniformities to prevent the unauthorized duplication and use of digital information is described. In the following description, numerous specific details are set forth such as bit pattern and program steps, etc. in order to provide a thorough understanding of the present invention. It will be obvious to one skilled in the art that the present invention may be practised without these specific details. In other instances, well-known steps such as those involved with encryption and decryption of data are not shown in order not to obscure the present invention.

NOTATION AND NOMENCLATURE

The detailed description with respect to the copy protection scheme using medium signature is presented partially in terms of algorithm and symbolic representation upon operation on data bits within the computer memory. These algorithmic descriptions and representations are the means used by those skilled in the art of data processing to most effectively convey the substance of their work to others skilled in the art.

An algorithm is here, and generally, conceived to be a self-consistent sequence of steps leading to a desired result. These steps are those require physical manipulation of physical quantities. Usually, though not necessarily, these quantities take the form of electrical or magnetic signals capable of being stored, transferred, combined, and otherwise manipulated. In this case, the physical quantities are voltage signals which correspond to the information being distributed. It proves convenient at times, principally for reason of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities.

Further, the manipulations performed are often referred to in terms such as adding or comparing, which are commonly associated with the mental operations performed by a human operator. No such capability of a human operator is necessary, or desirable. In most cases, in any of the operations described herein which form part of the present invention, the operations are machine operations. Useful machines for performing the operations of the present invention include general purpose digital computers or similar devices such as digital signal processors. In all cases, it should be borne in mind that there is a distinction between the method operation in operating a computer or other apparatus and the method of computation itself. The present invention relates to method steps for preventing unauthorized use of distributed information via medium signature to generate other desired physical signals.

The present invention also relates to an apparatus for performing these operations. This apparatus may be specially constructed for the required purpose or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct specialized apparatus such as digital signal processor to perform the required method steps. The required structure for a variety of these machines would appear from the description given below.

GENERAL SYSTEM CONFIGURATION

A general model of information dissemination is shown in FIG. 1. Here, the information provider 10 refers to a supplier of all types of information including but not restricted to software, video, audio, graphics or any combination thereof. The transmission channel 20 represents the means and more specifically the media through which information is delivered to the information consumer 30 over paths 15 and 25. The transmission channel 20 includes but is not limited to any communication links such as computer network, satellite links, diskettes, optical disks or other storage medium. It should also be understood by one skilled in the art that the term information consumer is interchangeable with any user of information.

Figure 2:
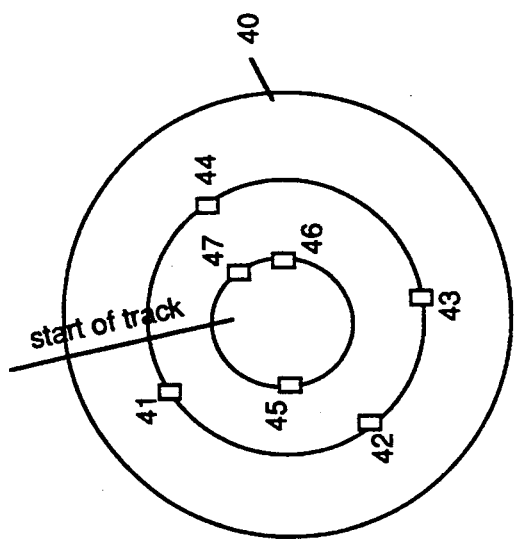
FIG. 2 illustrates sample nonuniformities on a storage medium.

Any storage medium such as magnetic disk or optical disk has physical nonuniformities due to imperfections in the fabrication of such medium. FIG. 2 illustrates sample nonuniformities 41–47 on a storage medium such as a disk 40. That the nonuniformities shown in FIGS. 2–5 are similar in pattern and size to each other are for the sake of simplicity and should not be taken as a limitation upon the scope of the present invention. Similarly the circular shape of the storage medium 40 is representative of a general class of storage media. In general nonuniformities occur in all types of non-volatile storage media. As the manufacturing processes achieve greater tolerances, these nonuniformities may be minimized but not likely to be eliminated entirely. Referring again to FIG. 2, nonuniformities 41–47 are detected with a nonuniformities detection program (NDP). The details of the NDP shall be elaborated further below.

Figure 3:
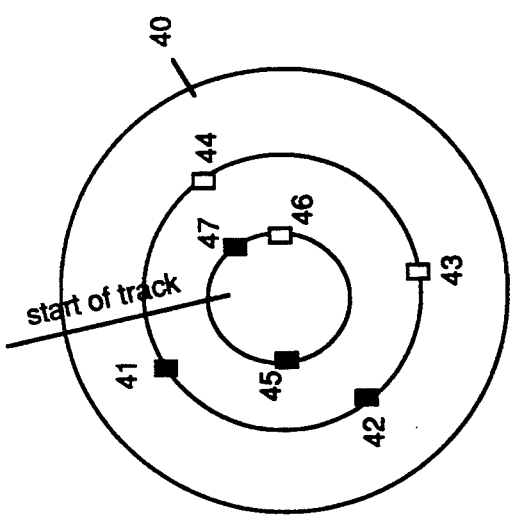
FIG. 3 shows a selected list of nonuniformities on the storage medium as in FIG. 2.

FIG. 3 shows a selected list of nonuniformities 41, 42, 45 and 47 being generated by a list generating program (LGP) after receiving the outputs from the NDP. By selected list, the present invention refers to a combination of the nonuniformities and/or the uniform bits on the storage medium 40. As will be described in detail below, the selected list will be used to generate a signature when the outputs of the LGP is fed into a signature generating program (SGP). The details of the SGP shall be elaborated further below. By signature, the present invention refers to the result of applying a function to the selected list. Such a function uses the attributes of a group of elements in the selected list. By attributes, this invention refers to the characteristics of bits on a storage medium which includes but not restricted to the track number, sector number, length, readability and writability.

Figure 4:
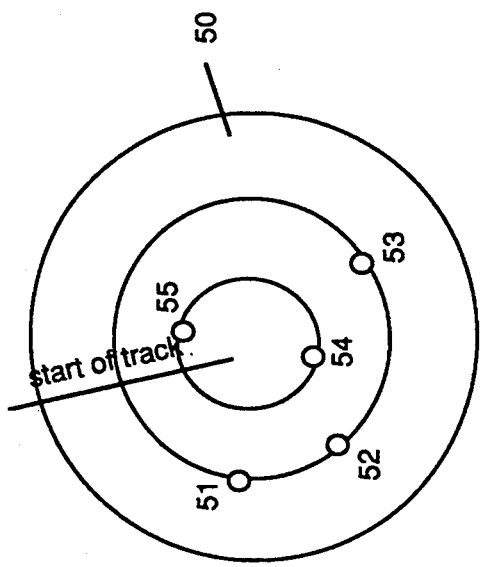
FIG. 4 illustrates sample nonuniformities on another storage medium.

FIG. 4 shows the nonuniformities 51–55 of a second storage medium 50. Just as the storage medium 40 in FIGS. 2 and 3, the storage medium 50 is represented by a circular disk. For purpose of differentiating nonuniformities 41–47 in FIGS. 2 and 3, nonuniformities 51–55 in FIG. 4 are shown to be in circular in shape as opposed to rectangular in shape. It should be understood by one skilled in the art that the nonuniformities on storage media 40 and 50 may have the same attributes. However, the chances of the number of nonuniformities and their attributes on the respective storage media are exactly the same are very remote. Moreover, the storage 40 in FIGS. 2 and 3 can be a magnetic disk while the storage medium 50 in FIG. 4 can be an optical disk.

Figure 5:
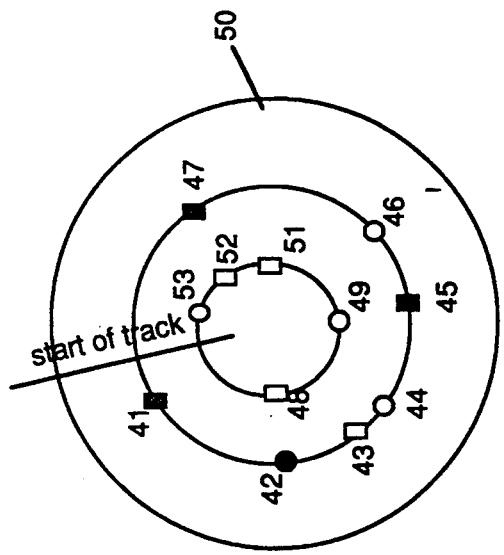
FIG. 5 shows the nonuniformities pattern from a bit by bit copying of the nonuniformities from the storage medium in FIG. 2 to that in FIG. 4.

FIG. 5 shows the overlapped nonuniformities pattern when a bit by bit copy of the storage medium 40 is made onto the storage medium 50. Referring to FIG. 5, the resulting pattern represents a nonuniformities pattern that is different from that in FIGS. 3 and 4. It is this unique signature of storage medium which the present invention takes advantage of. Hitherto, the data processing field has focused its efforts in masking the nonuniformities in order to store software and data reliably. Where there are single bit or a small number of bit nonuniformities, schemes such as Reed Solomon coding techniques are used to store and retrieve data with reasonable accuracy. In contrast, the present invention exploits the nonuniformities of storage medium to generate a signature which is unique for a given storage medium.

PREFERRED EMBODIMENT OF THE PRESENT INVENTION

1. Preparation of Distribution Package

FIG. 6 illustrates the manner in which a package of information is prepared by an information provider once the information consumer agrees to the terms of an information distribution contract. Typically, a distribution package contains the distributed information (DI) in an encrypted form together with supporting information (SI). By DI the present invention refers to information being distributed by the information provider. In general, DI does not include software which assists in gaining access to the present invention. In contrast, SI refers to all the enabling programs of the present invention along with other necessary software and data. The DI and SI may reside on a single storage medium. Alternatively, they can be stored on different storage media. For example, the SI can reside on more than one storage media. Normally only the DI is encrypted. However, encryption of all or part of SI may be done if necessary.

Figure 6A:
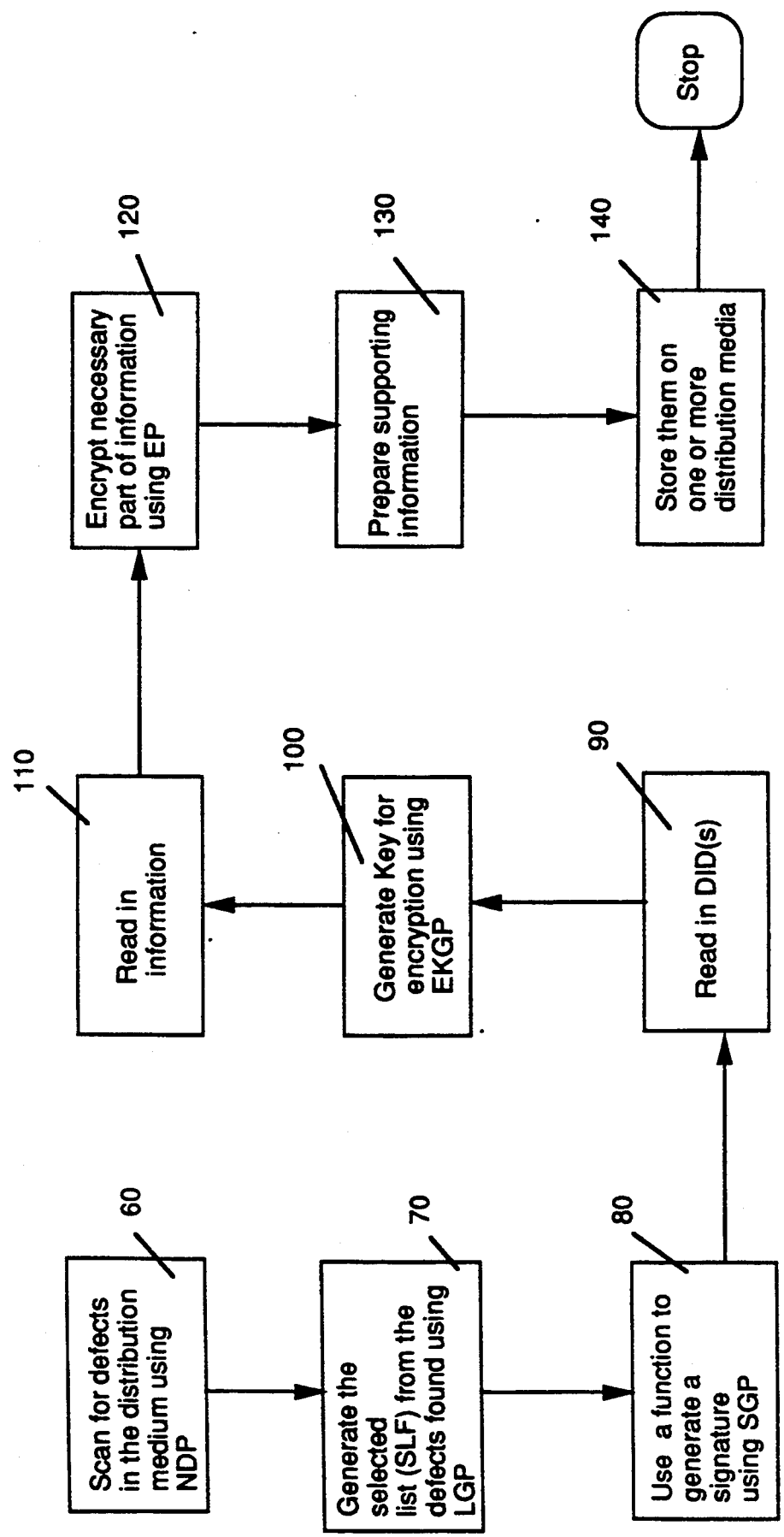
FIG. 6A shows the steps an information provider prepares a distribution package in accordance to the preferred embodiment of the present invention.

In FIG. 6A the information provider scans in step 60 a storage medium for nonuniformities using a nonuniformities detection program (NDP). The NDP scans the medium and determines the locations of the nonuniformities of the medium. Typically, an NDP reads a given location on a storage medium, tests whether there are any nonuniformities due to the manufacturing process. These nonuniformities manifest themselves in many ways. The NDP returns a value of a location as either "good" or "bad". In general, a "bad" location is one which cannot be used for storing a chosen bit of information. Some form of NDP are used in MS-DOS ® Format Command and Norton Utilities ®. MS-DOS is a registered trademark of Microsoft Corporation and Norton Utilities is a registered trademark of Peter Norton.

Figure 6B:
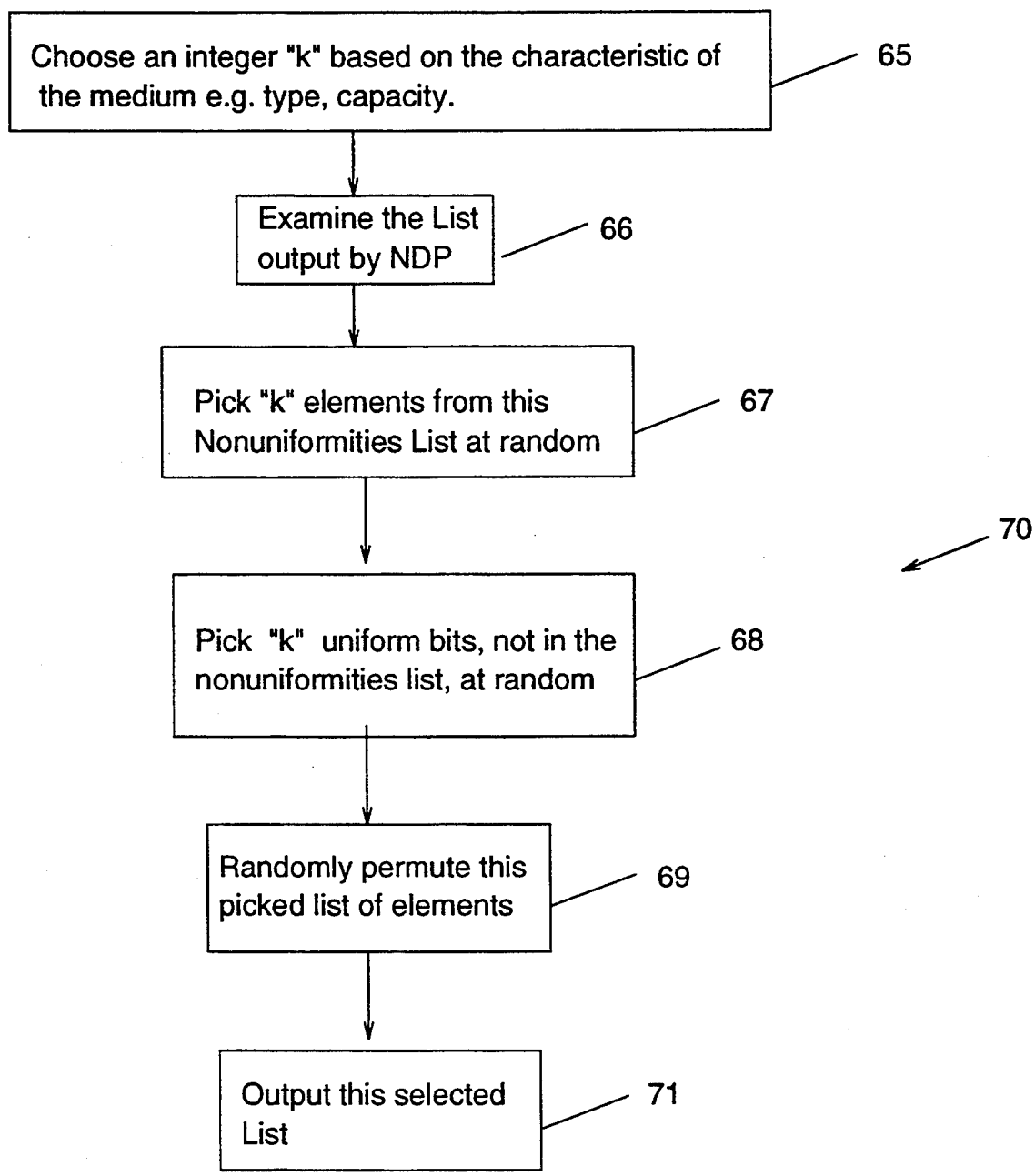
FIG. 6B illustrates the flow diagram of the list generating program (LGP) used in the preferred embodiment of the present invention.

The output from the NDP in step 60 is provided as input to step 70 where a selected list is generated by a list generating program (LGP). FIG. 6B is a flow diagram of the LGP used in the preferred embodiment of the present invention. In step 65 an integer "k" is chosen based on the characteristics of the storage medium e.g., type, capacity or otherwise. The LGP then examines the output from the NDP in step 66. Thereafter "k" elements from the nonuniformities are selected at random. At the same time, "k" elements of the uniform bits which are not on the nonuniformities list are also selected at random in step 67. The two chosen lists are permuted randomly in step 69 before it is outputted as the selected list in step 71. The LGP also supplies the attributes of the locations chosen.

Figure 6C:
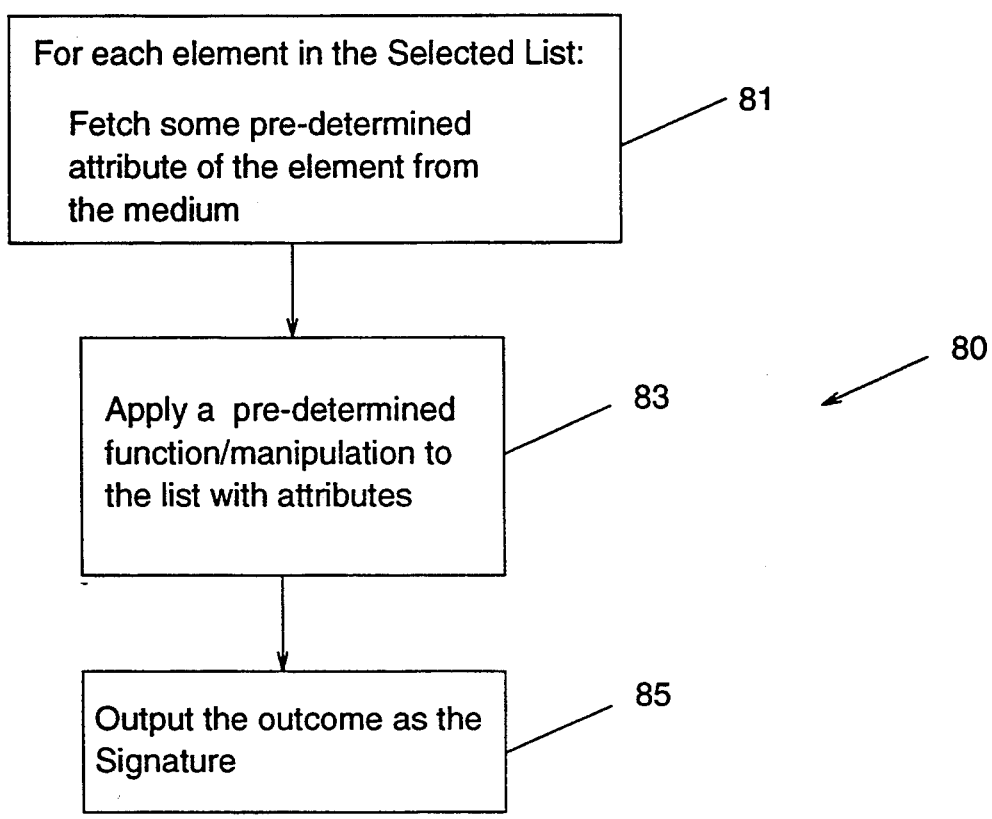
FIG. 6C illustrates the flow diagram of the signature generating program (SGP) used in the preferred embodiment of the present invention.

Referring again to FIG. 6A, the selected list from LGP in step 70 is furnished as input to step 80 where a signature generating program (SGP) applies a pre-determined function to the selected list to derive a signature for the storage medium in question. FIG. 6C is a flow diagram of the SGP used in the preferred embodiment of the present invention. As mentioned in the preceding paragraph, the output from the LGP, the selected list, is supplied as input to the SGP in step 81. Here, the SGP fetches some pre-determined attributes of the elements from the storage medium. Next, the SGP applies a pre-determined function to the list with the attributes in step 83. Finally, in step 85 the result of the manipulation by the pre-determined function in step 83, i.e. the signature, is supplied as input to step 90 in FIG. 6A. It should be understood by one skilled in the art that the function utilized by the SGP could be a mathematical or some other pre-determined manipulation.

In FIG. 6A, together with the signature of the storage medium, the present invention reads the storage medium's identification (DID-S) in step 90 in order to generate a key for encrypting the DI and/or SI in step 100. Here, the encryption key is generated by a encryption key generation program (EKGP). The details of EKGP depends on the particular encryption/decryption (EP/DP) scheme employed. In general, EKGP applies a pre-determined function or manipulation to the medium signature to generate a string to the key specification of the EP/DP scheme used. EP and DP will be described further below. Next, the DI is read in step 110 and encrypted with the key generated in step 100 using a EP in step 120. The output of step 120 is the encrypted distributed information (EDI). The EP/DP can be any of the known methods of encryption and decryption. One such example is DES. See D.E.R. Denning, Cryptography and Data Security, Addision-Wesley, Reading, Mass., 1983. In step 130, the information provider decides whether to put the EDI and SI in one or more distribution medium. Furthermore, the information provider decides whether to encrypt any of the SI. In step 140, the distribution package is then send out to the information consumer.

2. Access of Information

Figure 7A:
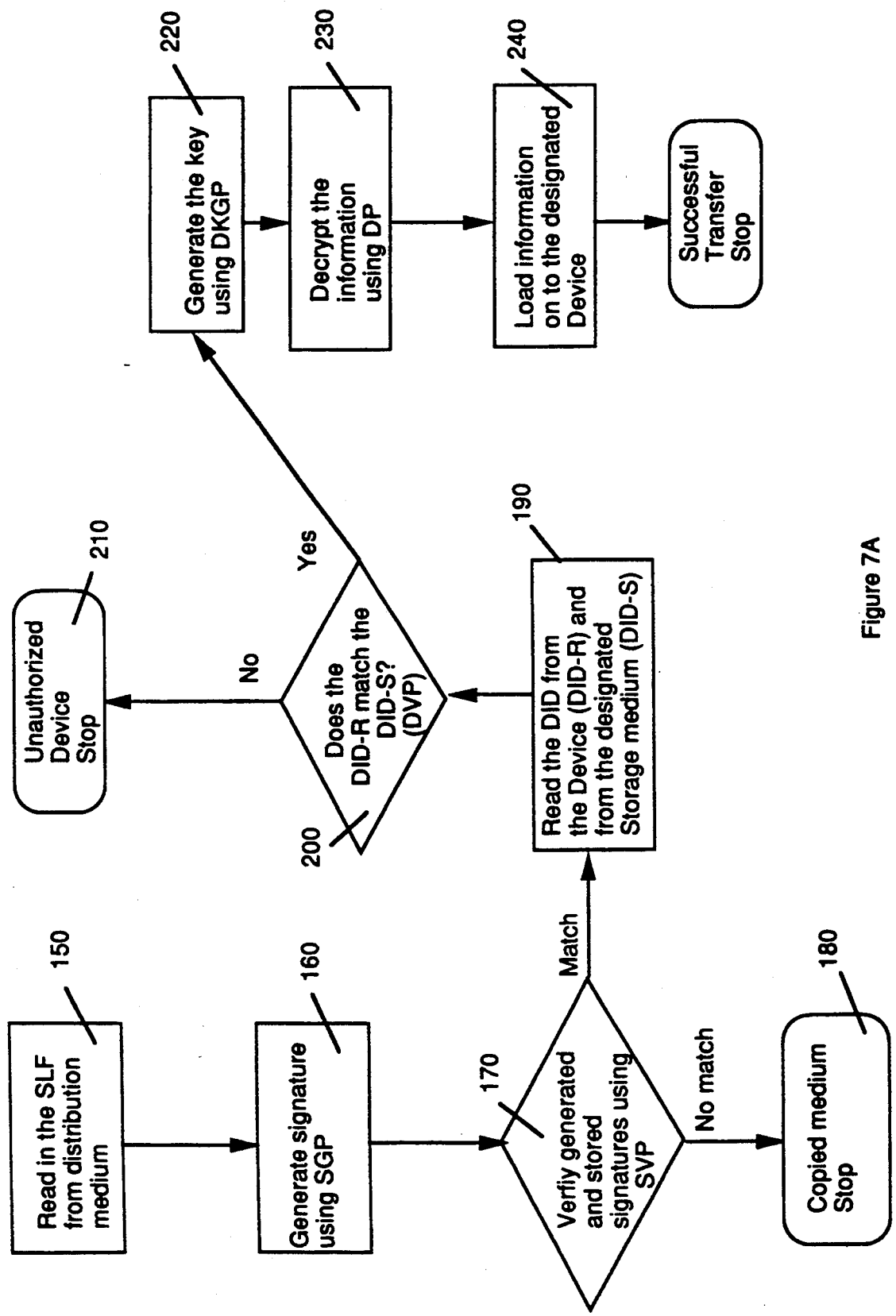
FIG. 7A illustrates the steps an information consumer accesses and uses the information from the distribution package prepared in FIGS. 6A-6C.
Figure 7B:
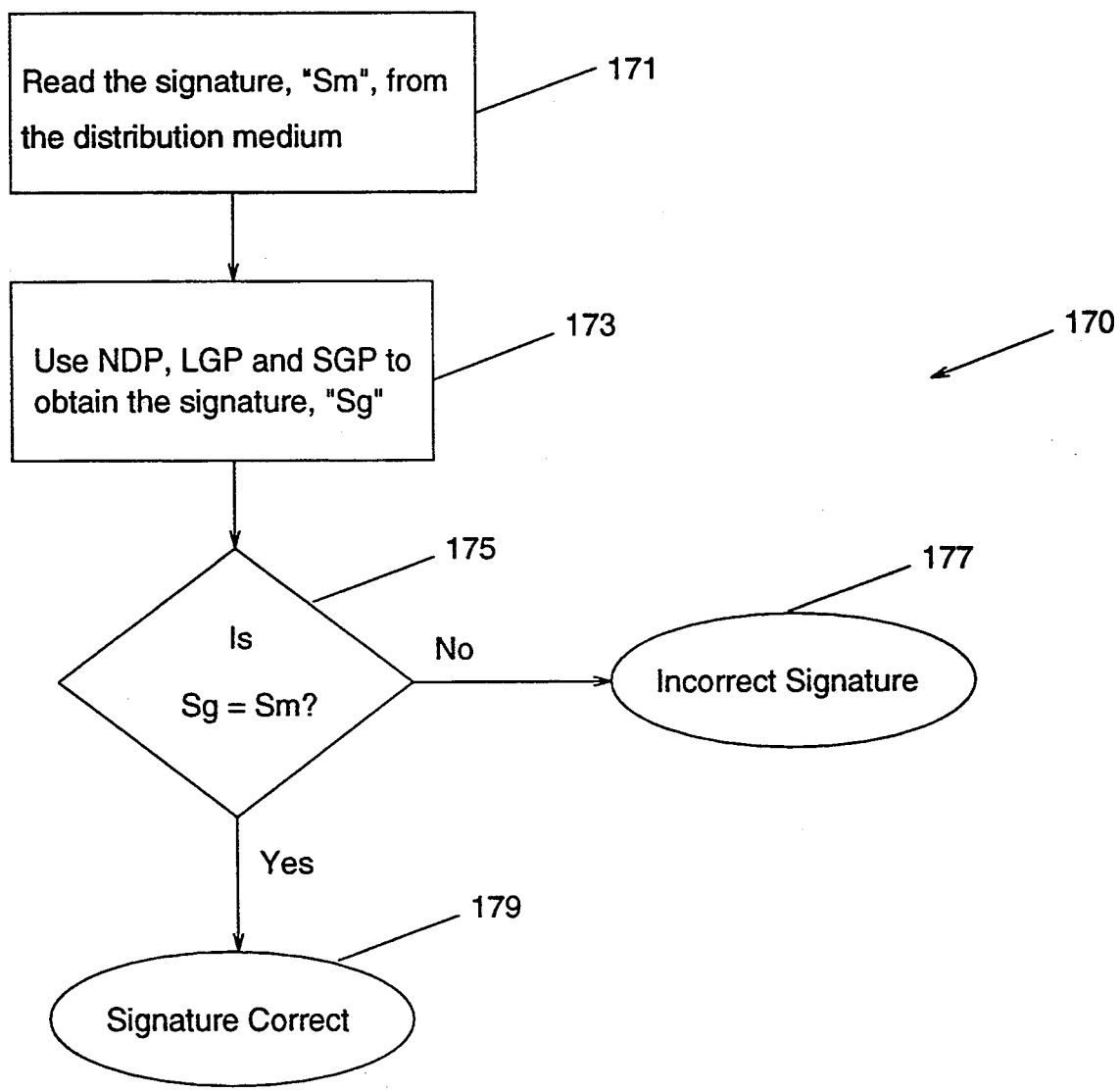
FIG. 7B illustrates the flow diagram of the signature verification program (SVP) used in the preferred embodiment of the present invention.

FIGS. 7A-B illustrates the manner in which the information consumer accesses and uses the information contained in the distribution package prepared in the section above. In FIG. 7 the information consumer reads in the file containing the selected list (SLF) from the distribution medium in step 150. The output from step 150 is used as an input to step 160 where the SGP is employed to generate the signature for the storage medium. Next, in step 170 the signature of the distribution medium is verified. In particular, when a storage medium is presented to a read/write peripheral, a program called signature verification program (SVP) is invoked. The SVP checks whether the signature of the medium is identical to the signature indicated in the distribution package. Referring to FIG. 7B, in step 171 the SVP reads the signature $S_m$ from the distribution medium. The SVP then relies on NDP, LDP and SGP to generate the signature $S_g$ of the distribution medium in step 173. The outputs of step 171 and 173 are compared in step 175. If there is no match, then a condition of incorrect signature is indicated in step 177. There are two possibilities for the incorrect signature: (1) a read/- write peripheral fails to transfer the nonuniformities from the distribution medium to a copied medium, or (2) the storage medium is a copied or unauthorized medium. Both outcomes are detected by the SVP in step 175. It follows that an evade program is invoked in step 180 to halt the program altogether.

Assuming that there is a match of the signatures in step 175, then the present invention reads the device ID (DID-R) from the information consumer's device and from the designated storage device (DID-S) as shown in step 190 of FIG. 7A. Next, the ID of the designated device is authenticated in step 200 by the device verification program DVP. The DID-R from the information consumer's device is compared with the stored DID-S for the designated device. If there is no match, an evade program is enabled as an unauthorized device is found in step 210. Otherwise, the positive matching of the device IDs in step 200 activates the decryption key generating program (DKGP) in step 220. Just as the EKGP in FIG. 6A, the implementation of DKGP depends on the particular EP/DP scheme employed. Referring again to FIG. 7A, the signature of the distribution medium and DID-S are inputs to the DKGP or other decryption key generating program. The DKGP generates the decryption key (DK). With the decryption key from step 220, the present invention enables the information consumer to decrypt the encrypted information (EDI). It should be understood by one skilled in the art that the output from DK is the distributed information (DI) in its natural or clear form. Finally, the distributed information is transferred to the designated device in step 240.

While the present invention has been described particularly with reference to FIGS. 1 to 7 with emphasis on a method for utilizing medium nonuniformities to minimize unauthorized duplication of information in a distribution environment, it should be understood that the figures are for illustration only and should not be taken as a limitation on the invention. In addition, it is clear that the method of the present invention has utility in many applications where copy protection of information is required. It is contemplated that many changes and modifications may be made by one of ordinary skill in the art without departing from the spirit and the scope of the invention as described.

We claim:

1. In a system for distributing information including at least a storage medium and at least an output device, said information including both distributed information (DI) and supporting information (SI), a method for preventing unauthorized use of said information on said storage medium, said storage medium having nonuniformities and uniformities, said method comprising the steps of:

generating a signature from the nonuniformities of said storage medium without introducing any artificial indica on the medium;

incorporating said signature into an encryption key and encrypting said information prior to distributing said storage medium;

permitting access to said storage medium by said device in response to verification of said signature; and generating a decryption key with said signature for decrypting said information and permitting access to said information by said device.

2. The method as defined in claim 1, wherein said information comprises any digital information.

3. The method as defined in claim 1, wherein said information is encrypted in part or in total.

4. The method as defined in claim 1, wherein said signature is function of a list which comprises of said nonuniformities, uniformities and their attributes.

5. The method as defined in claim 4, wherein said list comprises a subset of all of said nonuniformities, uniformities and their attributes.

6. The method as defined in claim 5, wherein said subset is arbitrarily selected.

7. The method as defined in claim 5, wherein said subset is selected non arbitrarily.

8. In a system for distributing information including at least a storage medium and at least a designated device, said device having an unique identification (ID) number, said information including both distributed information (DI) and supporting information (SI), a method for preventing unauthorized use of said information on said storage medium, said storage medium having nonuniformities and uniformities, said method comprising the steps of:

generating a signature from the nonuniformities of said storage medium without introducing any artificial indica on the medium;

incorporating said signature and said device ID into an encryption key and encrypting said information prior to distributing said storage medium;

permitting access to said storage medium by said device in response to verification of said signature and said device ID; and generating a decryption key with said signature and said device ID for decrypting said information and permitting access to said information on said device.

9. The method as defined in claim 8, wherein said information comprises any digital information.

10. The method as defined in claim 8, wherein said information is encrypted in part or in total.

11. The method as defined in claim 8, wherein said signature is a function of a list of said nonuniformities, uniformities and their attributes.

12. The method as defined in claim 11, wherein said list is a subset of all of said non uniformities, uniformities and their attributes.

13. The method as defined in claim 12, wherein said subset is arbitrarily selected.

14. The method as defined in claim 12, wherein said subset is selected non arbitrarily.

* * * * *